US012783971B2

(12) United States Patent
Yokoyama

(10) Patent No.: US 12,783,971 B2
(45) Date of Patent: Nov. 3, 2026

(54) METHOD OF MANAGING CARBON DIOXIDE EMISSION AMOUNT

(71) Applicant: SEIKO EPSON CORPORATION, Tokyo (JP)

(72) Inventor: Koichiro Yokoyama, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/961,562

(22) Filed: Nov. 27, 2024

(65) Prior Publication Data

US 2025/0182002 A1 Jun. 5, 2025

(30) Foreign Application Priority Data

Dec. 1, 2023 (JP) ................................ 2023-203696

(51) Int. Cl.
*G06Q 10/063* (2023.01)
*G05B 19/418* (2006.01)

(52) U.S. Cl.
CPC ....... *G06Q 10/063* (2013.01); *G05B 19/4183* (2013.01); *G05B 19/4185* (2013.01)

(58) Field of Classification Search
CPC ...... G05B 19/4185; Y02P 90/84; Y02P 90/30; G06Q 50/26; G06Q 50/06; G06Q 30/018; G06Q 10/04; G06Q 10/06
See application file for complete search history.

(56) References Cited

U.S. PATENT DOCUMENTS

2024/0161128 A1* 5/2024 Blair de Verteuil ... G06Q 10/06
2025/0243626 A1* 7/2025 Stark .................... D21G 9/0027

FOREIGN PATENT DOCUMENTS

JP 2018168492 A * 11/2018
JP 2019-077984 A 5/2019
(Continued)

OTHER PUBLICATIONS

Translation of JP-2025088079-A (Year: 2025).*
(Continued)

*Primary Examiner* — Jerry O'Connor
*Assistant Examiner* — Michael R Koester
(74) *Attorney, Agent, or Firm* — Spencer Fane LLP

(57) ABSTRACT

A sheet manufacturing apparatus includes a defibrating portion that defibrates a raw material by being driven by a motor, a current measurement portion that measures a current consumption of the motor, and a counting portion that counts the production count of sheets. The sheet manufacturing apparatus, at each time of running once, calculates a defibrating power amount that is a power consumption amount of the defibrating portion based on the current consumption of the motor measured by the current measurement portion, and transmits the production count and the defibrating power amount to the server. Each time the sheet manufacturing apparatus runs once, the server calculates an apparatus power amount that is a power consumption amount of the entirety of the sheet manufacturing apparatus based on the production count and the defibrating power amount, calculates a carbon dioxide emission amount of the sheet manufacturing apparatus based on the apparatus power amount, and notifies the user of the sheet manufacturing apparatus of the calculated carbon dioxide emission amount.

4 Claims, 5 Drawing Sheets

(56) References Cited

FOREIGN PATENT DOCUMENTS

| | | | | | |
|---|---|---|---|---|---|
| JP | 2025088079 | A | * | 6/2025 | D21B 1/08 |
| WO | WO-03080923 | A1 | * | 10/2003 | D21D 1/002 |

OTHER PUBLICATIONS

Translation of JP-2018168492-A (Year: 2018).*

Modak, Nabanita et al. "Building a comprehensive mill-level database for the Industrial Sectors Integrated Solutions (ISIS) model of the U.S. pulp and paper sector." PloS one vol. 10,3 e0120954. Mar. 25, 2015 < https://pmc.ncbi.nlm.nih.gov/articles/PMC4373909/ > (Year: 2015).*

* cited by examiner

METHOD OF MANAGING CARBON DIOXIDE EMISSION AMOUNT

The present application is based on, and claims priority from JP Application Serial Number 2023-203696, filed Dec. 1, 2023, the disclosure of which is hereby incorporated by reference herein in its entirety.

BACKGROUND

1. Technical Field

The present disclosure relates to a method of managing a carbon dioxide emission amount.

2. Related Art

JP-A-2019-77984 discloses a sheet manufacturing apparatus that dry-defibrates a raw material containing fibers, lets a mixture containing the defibrated raw material accumulate, and molds the accumulation into a sheet. In recent years, as efforts to reduce carbon dioxide emissions have gained attention, there has been a growing need to grasp a carbon dioxide emission amount of a sheet manufacturing apparatus for the purpose of public release in an environmental report or the like.

However, it has not been easy so far to grasp a carbon dioxide emission amount of a sheet manufacturing apparatus. Therefore, a solution that enables the user to grasp the carbon dioxide emission amount of the sheet manufacturing apparatus is demanded.

SUMMARY

A certain aspect of the present disclosure is a method of managing a carbon dioxide emission amount in a management system. The management system includes a sheet manufacturing apparatus that manufactures sheets and a server that is connected to the sheet manufacturing apparatus via a network. The sheet manufacturing apparatus includes a defibrating portion that defibrates a raw material by being driven by a motor, a current measurement portion that measures a current consumption of the motor, and a counting portion that counts a number of the sheets manufactured, the number being hereinafter referred to as production count. The sheet manufacturing apparatus, at each time of running once, calculates a defibrating power amount, which is a power consumption amount of the defibrating portion, based on the current consumption of the motor measured by the current measurement portion; and transmits the production count and the defibrating power amount to the server via the network. The server, the each time the sheet manufacturing apparatus runs once, calculates an apparatus power amount, which is a power consumption amount of an entirety of the sheet manufacturing apparatus, based on the production count and the defibrating power amount, calculates a carbon dioxide emission amount of the sheet manufacturing apparatus, based on the apparatus power amount; and notifies a user of the sheet manufacturing apparatus of the calculated carbon dioxide emission amount via the network.

DESCRIPTION OF EMBODIMENTS

Figure 1:
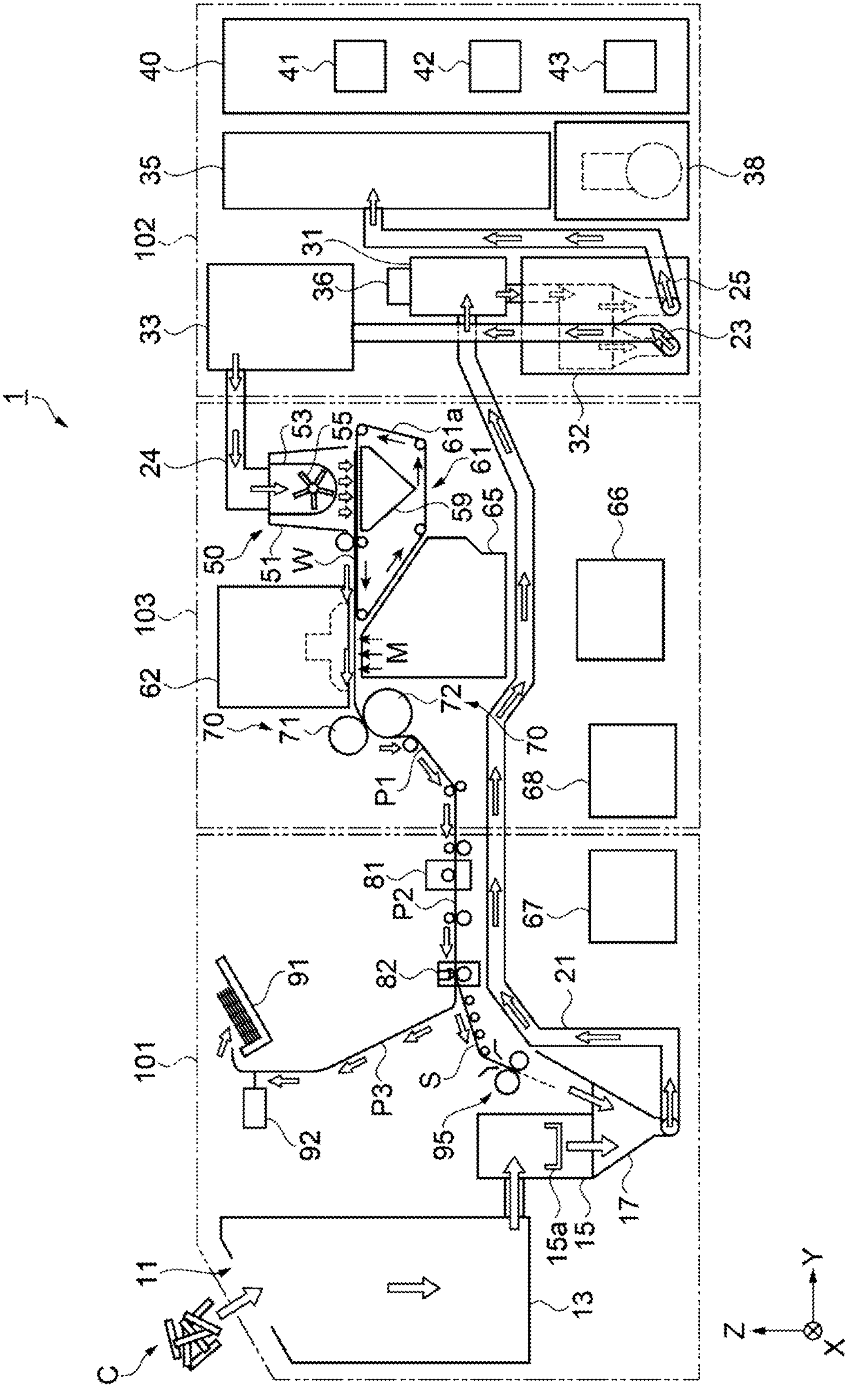
FIG. 1 is a schematic side view of a sheet manufacturing apparatus.

A sheet manufacturing apparatus 1 according to the present embodiment will now be described. FIG. 1 is a schematic side view of the sheet manufacturing apparatus 1 according to the present embodiment. The sheet manufacturing apparatus 1 according to the present embodiment is an apparatus that defibrates the fragments of paper such as waste paper by using a dry method so as to recycle them into a sheet. The method used by the sheet manufacturing apparatus 1, however, is not limited to a dry method. A wet method may be used instead. In this specification, the term “dry” means that operations are performed under atmospheric conditions, such as in air, without involving any liquid.

In FIG. 1, an X axis, a Y axis, and a Z axis, which intersect with one another, are illustrated. In the present embodiment, the X, Y, and Z axes are orthogonal to one another. Specifically, an XY plane, which includes the X axis and the Y axis, is horizontal, and the Z axis is vertical. The direction indicated by the head of an arrow on each axis is defined as a plus (+) direction. The opposite direction is defined as a minus (−) direction. The +Z direction may be hereinafter referred to as “upper” or “above/over”, and the −Z direction may be hereinafter referred to as “lower” or “below/under”. The directional side toward which a raw material, a web, a sheet, and the like are transported in the sheet manufacturing apparatus 1 may be referred to as “downstream”, and the opposite side may be referred to as “upstream”. For convenience of illustration, each member is not drawn to scale.

As illustrated in FIG. 1, the sheet manufacturing apparatus 1 according to the present embodiment includes a first unit 101, a second unit 102, and a third unit 103. The first unit 101, the second unit 102, and the third unit 103 are supported by frames that are not illustrated. In FIG. 1, the direction in which waste paper C, sheets P3, slit strips S, unwanted remnants, and the like move is indicated by empty arrows.

The sheet manufacturing apparatus 1 manufactures the sheets P3 from the waste paper C, which is a raw material. In the sheet manufacturing apparatus 1, the first unit 101, the third unit 103, and the second unit 102 are disposed in this order from the −Y side toward the +Y1 side.

The waste paper C is sent from the first unit 101 to the second unit 102 through a pipe 21 extending across the inside of the third unit 103. Then, the waste paper C turns into fibers by undergoing a defibration process and the like at the second unit 102, and thereafter turns into a mixture containing a binder and the like. The mixture is sent from the second unit 102 to the third unit 103 through a pipe 24. The mixture is formed into a web W at the third unit 103, and is thereafter molded into a band-shaped sheet P1. The band-shaped sheet P1 is cut at the first unit 101 to turn into the sheets P3.

The first unit 101 includes a buffer tank 13, a fixed amount supplying portion 15, a merging portion 17, and the pipe 21. In the first unit 101, these components are disposed in this order from the upstream side toward the downstream side. The first unit 101 further includes a first cutting portion 81, a second cutting portion 82, a tray 91, a counting portion 92, and a fragmenting portion 95. The first cutting portion 81 and the second cutting portion 82 cut the band-shaped sheet P1 into the sheets P3 each having a predetermined shape. The first unit 101 further includes a water supply portion 67. The water supply portion 67 is a reservoir tank. The water supply portion 67 supplies humidifying water to each of a first humidifying portion 65 and a second humidifying portion 66, which will be described later, through non-illustrated water supply pipes.

The waste paper C is fed into the buffer tank 13 through a raw material feed port 11. The waste paper C contains fibers such as cellulose, and is, for example, in the form of fragments of waste paper having been subjected to shredding. Humidified air is supplied to the inside of the buffer tank 13 from the second humidifying portion 66 provided in the third unit 103.

The waste paper C is temporarily stored in the buffer tank 13, and is thereafter sent to the fixed amount supplying portion 15 in accordance with the running of the sheet manufacturing apparatus 1. The sheet manufacturing apparatus 1 may include a shredder that shreds the waste paper C or the like upstream of the buffer tank 13.

The fixed amount supplying portion 15 includes a weighing device 15*a* and a non-illustrated supply mechanism. The weighing device 15*a* measures the mass of the waste paper C. The supply mechanism supplies the waste paper C having been weighed by the weighing device 15*a* to the merging portion 17 disposed downstream thereof. That is, the fixed amount supplying portion 15 weighs the waste paper C into a predetermined mass each by using the weighing device 15*a*, and supplies it to the merging portion 17 disposed downstream thereof by using the supply mechanism. The weighing and supplying of the waste paper C at the fixed amount supplying portion 15 is batch processing. That is, the supplying of the waste paper C from the fixed amount supplying portion 15 to the merging portion 17 is performed intermittently.

At the merging portion 17, fragments of the slit strips S supplied from the fragmenting portion 95 merge with, and are mixed with, the waste paper C supplied from the fixed amount supplying portion 15. The slit strips S and the fragmenting portion 95 will be described later. The waste paper C having been mixed with the slit fragments flows into the pipe 21 from the merging portion 17.

The waste paper C is sent from the first unit 101 to the second unit 102 through the pipe 21 by an airflow produced by a non-illustrated blower.

The second unit 102 includes a defibrating portion 31 that is a dry defibrator, a separating portion 32, a pipe 23, a mixing portion 33, and the pipe 24. In the second unit 102, these components are disposed in this order from the upstream side toward the downstream side. The second unit 102 further includes a pipe 25 connected to the separating portion 32, a collecting portion 35, a compressor 38, and a control device 40.

The waste paper C having been sent through the pipe 21 flows into the defibrating portion 31. The defibrating portion 31 performs dry defibration to turn the waste paper C having been supplied from the fixed amount supplying portion 15 into fibers. A known defibrating mechanism can be applied to the defibrating portion 31.

The defibrating portion 31 includes a motor 36, a non-illustrated stator, and a non-illustrated rotor. The stator has a substantially cylindrical inner surface. The rotor is disposed inside the stator, and rotates along the inner surface of the stator by being driven by the motor 36, thereby defibrating the waste paper C. The fragments of the waste paper C go into a gap between the stator and the rotor, and are defibrated by a sheer force produced between them. This disentangles entangled fibers included in the fragments of the waste paper C. The waste paper C having been defibrated is sent to the separating portion 32.

The separating portion 32 sorts the defibrated fibers. To elaborate, the separating portion 32 removes, from the defibrated fibers, ingredients that are not needed for manufacturing the sheet P3. Specifically, the separating portion 32 sorts the fibers into those that are relatively long and those that are relatively short. Fibers that are relatively short could sometimes cause a decrease in the strength of the sheet P3. Therefore, the fibers that are relatively short are screened out at the separating portion 32. In addition, the separating portion 32 screens out a colorant, an additive, and the like included in the waste paper C. Known technology such as a disc mesh scheme can be applied to the separating portion 32. Humidified air is supplied to the inside of the separating portion 32 from the second humidifying portion 66 of the third unit 103.

The defibrated fibers after the removal of those that are relatively short at the separating portion 32 are sent to the mixing portion 33 through the pipe 23. Unwanted ingredients such as the fibers that are relatively short, the colorant, and the like are discharged to the collecting portion 35 through the pipe 25.

The mixing portion 33 produces a mixture by mixing a binder and the like into the fibers in air. The mixing portion 33 includes a flow passage through which the fibers are sent, a fan, a hopper, a supply duct, and a valve, though not illustrated. The hopper is in communication with the flow passage of the fibers through the supply duct. The hopper supplies the binder such as starch into the flow passage. The valve is provided in the supply duct between the hopper and the flow passage. The valve adjusts the mass of the binder supplied from the hopper into the flow passage. By this means, the mixing ratio of the fibers and the binder is adjusted. Besides the above-described configuration for supplying the binder, the mixing portion 33 may have a similar configuration for supplying a colorant, an additive, and/or the like. The mixing portion 33 produces a mixture by mixing the binder and the like into the fibers in air while sending the fibers downstream by using the airflow produced by the fan. The mixture flows into the pipe 24 from the mixing portion 33.

The collecting portion 35 includes a non-illustrated filter. The filter traps the unwanted ingredients such as the relatively short fibers coming in by being transported by the airflow through the pipe 25.

The compressor 38 produces compressed air. It could happen that the filter described above becomes clogged by fine particles or the like included in the unwanted ingredients. In such a case, it is possible to clean the filter by blowing the particles away by applying the compressed air produced by the compressor 38 to the filter.

The control device 40 includes a control portion 41, a storage portion 42, and a communication portion 43. The control portion 41 includes a processor such as a central processing unit (CPU), and controls the operation of the sheet manufacturing apparatus 1 by operating in accordance with non-illustrated programs stored in the storage portion 42. The storage portion 42 is a storage device such as a hard disk drive, a solid state drive (SSD), a memory, or the like, and stores the above-mentioned programs, various kinds of setting data, and the like. The communication portion 43 includes various kinds of interface circuit for communicating with external devices. The communication portion 43 according to the present embodiment includes an interface circuit for performing communication via a network NW (see FIG. 2). The control device 40 further includes a non-illustrated power supplying portion. The power supplying portion distributes, to each component of the sheet manufacturing apparatus 1, power supplied from the outside.

The third unit 103 causes the mixture containing the fibers to pile up, thereby producing an accumulation of the mixture, and presses the accumulation of the mixture, thereby forming the band-shaped sheet P1 that is recycled paper. The third unit 103 includes an accumulating portion 50, a first transporting portion 61, a second transporting portion 62, the first humidifying portion 65, the second humidifying portion 66, a drainage portion 68, and a molding portion 70.

The accumulating portion 50, the first transporting portion 61, the second transporting portion 62, the first humidifying portion 65, and the molding portion 70 are disposed in this order from the upstream side toward the downstream side in the third unit 103. The second humidifying portion 66 is disposed under the first humidifying portion 65.

The accumulating portion 50 forms the web W by letting the mixture containing the sorted fibers fall in air to pile up. The accumulating portion 50 includes a drum member 53, a blade member 55 provided inside the drum member 53, a housing 51 in which the drum member 53 is housed, and a sucking portion 59. The mixture is taken into the drum member 53 from the pipe 24.

The first transporting portion 61 is disposed under the accumulating portion 50. The first transporting portion 61 includes a mesh belt 61*a* stretched on and around a plurality of stretching rollers. The sucking portion 59 faces the drum member 53, with the mesh belt 61*a* interposed therebetween, in a direction along the Z axis.

The blade member 55 is disposed inside the drum member 53, and is driven to rotate by a non-illustrated motor. The drum member 53 is a semi-cylindrical sieve. A net that has a sieve function is provided at the surface, of the drum member 53, facing down. The drum member 53 allows fibers, mixture particles, etc. that are each smaller than the mesh of the net of the sieve to pass from the inside to the outside.

The mixture is discharged to the outside of the drum member 53 while being agitated by the blade member 55 rotating inside the drum member 53. Humidified air is supplied to the inside of the drum member 53 from the second humidifying portion 66.

The sucking portion 59 is disposed under the drum member 53. The sucking portion 59 sucks air that is present inside the housing 51 through a plurality of holes that the mesh belt 61*a* has. The plurality of holes of the mesh belt 61*a* allows air to pass, but does not allow the fibers, the binder, etc. contained in the mixture to pass easily. The mixture having been discharged to the outside of the drum member 53 is sucked downward together with the air. The sucking portion 59 is a known suction device such as a blower. The mixture is dispersed in the air that is present inside the housing 51, and falls due to the gravity and due to the suction by the sucking portion 59 to pile up on the upper surface of the mesh belt 61*a*, thereby turning into the web W.

The mesh belt 61*a* is an endless belt, and is stretched on and around the plurality of stretching rollers. Due to the rotation of the stretching rollers, the mesh belt 61*a* turns counterclockwise in FIG. 1. Therefore, the mixture accumulates on the mesh belt 61*a* successively, forming the web W. The web W contains a relatively large amount of air and is thus soft and bulky. By using the turning of the mesh belt 61*a*, the first transporting portion 61 transports the web W having been formed thereon toward the downstream side.

Downstream of the first transporting portion 61, the second transporting portion 62 takes over the transportation of the web W from the first transporting portion 61. The second transporting portion 62 causes the web W to come off from the upper surface of the mesh belt 61*a*, and transports the web W toward the molding portion 70. The second transporting portion 62 is disposed over the transportation path of the web W, and is disposed slightly upstream of the return-side starting point of the mesh belt 61*a*. The +Y-side region of the second transporting portion 62 overlaps at least partially with the −Y-side region of the mesh belt 61*a* as viewed in the vertical direction.

The second transporting portion 62 includes a transportation belt, a plurality of rollers, and a suction mechanism that are not illustrated. A plurality of holes that allows air to pass is provided in the transportation belt. The transportation belt is stretched on and around the plurality of rollers, and turns by being driven by the rotation of these rollers.

The second transporting portion 62 causes the upper surface of the web W to be sucked onto the lower surface of the transportation belt by means of negative pressure generated by the suction mechanism. Due to the turning of the transportation belt in this state, the web W is transported downstream while being sucked onto the transportation belt.

The first humidifying portion 65 humidifies the web W that includes the fibers having been caused to accumulate by the accumulating portion 50 of the third unit 103. To elaborate, the first humidifying portion 65 is, for example, a mist-type humidifier, and supplies a mist M for humidification from below to the web W that is transported by the second transporting portion 62. The first humidifying portion 65 is disposed under the second transporting portion 62, and faces the web W that is transported by the second transporting portion 62. A known humidifying device, for example, an ultrasonic humidifying device or the like, can be applied to the first humidifying portion 65.

Humidifying the web W with the mist M facilitates the function of the starch as the binder. This enhances the strength of the sheet P3. Moreover, since the web W is humidified from below, it is possible to prevent the falling of a droplet originating from the mist onto the web W. Furthermore, since the web W is humidified from the side that is the opposite of the contact surface of the transportation belt and the web W, it is possible to suppress the clinging of the web W to the transportation belt. The second transporting portion 62 transports the web W to the molding portion 70.

The molding portion 70 molds the web W containing the fibers into a shape of the band-like sheet P1 by applying heat and pressure thereto. The molding portion 70 includes a first molding roller 71 and a second molding roller 72 as its molding rollers. Each of the first molding roller 71 and the second molding roller 72 includes a built-in electric heater, and is capable of increasing the temperature of a roller surface.

The first molding roller 71 and the second molding roller 72 are substantially columnar members. The rotating shaft of the first molding roller 71 and the rotating shaft of the second molding roller 72 are disposed along the X axis. The first molding roller 71 is disposed substantially above the transportation path of the web W. The second molding roller 72 is disposed substantially below the transportation path of the web W. Between the first molding roller 71 and the second molding roller 72, there is a clearance corresponding to the thickness of the sheet P3 that is to be manufactured.

The first molding roller 71 and the second molding roller 72 are driven to rotate by a non-illustrated motor. The web W is sent downstream while being nipped between the first molding roller 71 and the second molding roller 72 and receiving heat and pressure thereat. That is, the web W passes through the molding portion 70 continuously and is press-molded while receiving heat. Using the first molding roller 71 and the second molding roller 72 making up a pair makes it possible to apply heat and pressure to the web W efficiently.

By passing through the molding portion 70, the web W is molded into the band-shaped sheet P1 with a reduction in the amount of air contained therein and with the binding of the fibers included therein to one another due to the functioning of the binder. The band-shaped sheet P1 is transported to the first unit 101 by transporting rollers.

The second humidifying portion 66 humidifies a predetermined area in the sheet manufacturing apparatus 1. The predetermined area is one or more of the buffer tank 13, the separating portion 32, and the drum member 53 of the accumulating portion 50. Specifically, humidified air is supplied to the area mentioned above from the second humidifying portion 66 through a plurality of non-illustrated ducts. The humidified air suppresses electrification of the waste paper C, the fibers, and the like at each component described above, thereby suppressing the static cling of them to members thereat. A known vaporization-type humidifying device can be applied to the second humidifying portion 66. An example of the vaporization-type humidifying device is a device that blows air to a wet nonwoven fabric or the like to vaporize moisture, thereby producing humidified air.

The drainage portion 68 is a drain tank. The drainage portion 68 collects and stores stale moisture having been used by the first humidifying portion 65, the second humidifying portion 66, and the like. The drainage portion 68 is detached from the sheet manufacturing apparatus 1 when a pool of water stored in the drainage portion 68 is discarded.

The band-shaped sheet P1 transported to the first unit 101 arrives at the first cutting portion 81. The first cutting portion 81 cuts the band-shaped sheet P1 in a direction intersecting with the transportation direction, for example, in a direction along the X axis. The band-shaped sheet P1 is cut into each sheet P2 having a single-cut size at the first cutting portion 81. The single-size-cut sheet P2 is sent from the first cutting portion 81 to the second cutting portion 82.

The second cutting portion 82 cuts the single-size-cut sheet P2 in the transportation direction, for example, in a direction along the Y axis. To elaborate, the second cutting portion 82 trims the +X-side edge portion and the −X-side edge portion of the single-size-cut sheet P2. This cutting turns the single-size-cut sheet P2 into the sheet P3 having a predetermined shape, for example, A4, A3, or the like.

When the second cutting portion 82 cuts the single-size-cut sheet P2 into the shape of the sheet P3, the slit strips S, which are remnants, are produced. The slit strips S are sent in substantially the −Y direction, and arrive at the fragmenting portion 95, which is a shredder. The fragmenting portion 95 shreds the slit strips S into fragments, and supplies the fragments to the merging portion 17. A mechanism that weighs the fragments of the slit strips S and supplies a weighed amount of the fragments to the merging portion 17 may be provided between the fragmenting portion 95 and the merging portion 17.

The sheets P3 are transported substantially upward, and are then stacked on the tray 91. The sheets P3 are manufactured by the sheet manufacturing apparatus 1 as described above. The sheets P3 having been manufactured as described above can be used as, for example, a substitute for copier paper or the like. The counting portion 92 is disposed upstream of the tray 91. The counting portion 92 includes a sensor or the like that is capable of detecting each sheet P3 that passes. The counting portion 92 counts the number of the sheets P3 having been manufactured, that is, the production count of the sheets P3.

Figure 2:
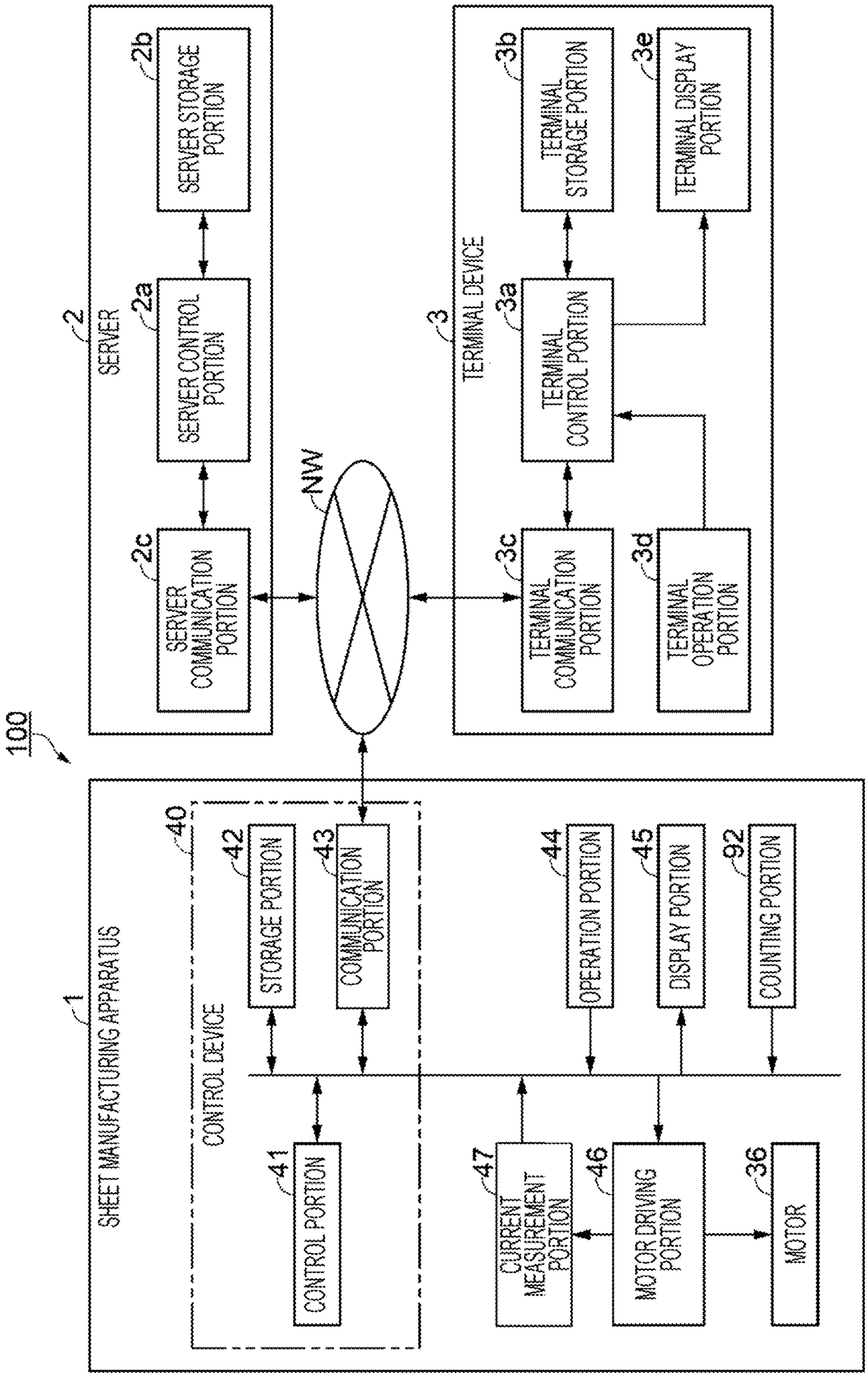
FIG. 2 is a block diagram illustrating a schematic configuration of a management system.

FIG. 2 is a block diagram illustrating a schematic configuration of a management system 100. The management system 100 manages the emission amount of carbon dioxide emitted in the process of manufacturing the sheets P3 by the sheet manufacturing apparatus 1.

As illustrated in FIG. 2, the management system 100 includes the sheet manufacturing apparatus 1 described above, a server 2, and a terminal device 3. All of the sheet manufacturing apparatus 1, the server 2, and the terminal device 3 are connected to a network NW. That is, the sheet manufacturing apparatus 1, the server 2, and the terminal device 3 are connected to one another via the network NW. A part of the configuration of the sheet manufacturing apparatus 1 described above is illustrated in FIG. 2.

The sheet manufacturing apparatus 1 includes an operation portion 44, a display portion 45, a motor driving portion 46, and a current measurement portion 47 as illustrated in FIG. 2 in addition to the control device 40, the motor 36, and the counting portion 92 described above. The operation portion 44 includes a plurality of operation keys and receives an input operation from the user. The operation portion 44 outputs operation information corresponding to the received input operation to the control portion 41. The display portion 45 includes a display device such as a liquid crystal display, and, based on control by the control portion 41, displays various kinds of information. The operation portion 44 may be configured integrally with the display portion 45 as in a touch panel.

The motor driving portion 46 includes a driving circuit that drives the motor 36 of the defibrating portion 31, and so forth. Based on control by the control portion 41, the motor driving portion 46 supplies an electric current to the motor 36, thereby driving the motor 36. The current measurement portion 47 measures the electric current supplied by the motor driving portion 46 to the motor 36, that is, the current consumption of the motor 36, and outputs the measurement result to the control portion 41.

The server 2 acquires predetermined information from the sheet manufacturing apparatus 1, and calculates the carbon dioxide emission amount of the sheet manufacturing apparatus 1. The server 2 manages the calculated carbon dioxide emission amount. A plurality of sheet manufacturing apparatuses 1 may be connected to the network NW. In this case, the server 2 manages the carbon dioxide emission amount for each of the sheet manufacturing apparatuses 1.

The server 2 includes a server control portion 2*a*, a server storage portion 2*b*, and a server communication portion 2*c*. The server control portion 2*a* includes a processor such as a CPU, and controls the operation of the server 2 by operating in accordance with non-illustrated programs stored in the server storage portion 2*b*. The server control portion 2*a* performs various kinds of operation in response to requests from the sheet manufacturing apparatus 1 and the terminal device 3, which are clients.

The server storage portion 2*b* is a storage device such as a hard disk drive, an SSD, a memory, or the like, and stores the above-mentioned programs, various kinds of setting data, and the like. The programs stored in the server storage portion 2*b* include a non-illustrated management program for managing the carbon dioxide emission amount. Various kinds of fixed value to be used for calculating the carbon dioxide emission amount, a database for storage of the calculated carbon dioxide emission amount and the like, are stored in the server storage portion 2*b* according to the present embodiment.

The server communication portion 2*c* includes an interface circuit for performing communication via the network NW. The server communication portion 2*c* can communicate with the sheet manufacturing apparatus 1 and the terminal device 3 via the network NW.

The terminal device 3 is an information processing apparatus possessed by the user of the sheet manufacturing apparatus 1, for example, a personal computer, a smartphone, or the like. The terminal device 3 is not an indispensable component. The management system 100 may be configured without the terminal device 3. A plurality of terminal devices 3 may be connected to the network NW.

The terminal device 3 includes a terminal control portion 3*a*, a terminal storage portion 3*b*, and a terminal communication portion 3*c*, a terminal operation portion 3*d*, and a terminal display portion 3*e*. The terminal control portion 3*a* includes a processor such as a CPU, and controls the operation of the terminal device 3 by operating in accordance with non-illustrated programs stored in the terminal storage portion 3*b*. The terminal storage portion 3*b* is a storage device such as a hard disk drive, an SSD, a memory, or the like, and stores the above-mentioned programs, various kinds of setting data, and the like. The terminal communication portion 3*c* includes an interface circuit for performing communication via the network NW.

The terminal operation portion 3*d* is a keyboard, etc. that includes a plurality of operation keys, and receives an input operation from the user. The terminal operation portion 3*d* outputs operation information corresponding to the received input operation to the terminal control portion 3*a*. The terminal display portion 3*e* includes a display device such as a liquid crystal display, and, based on control by the terminal control portion 3*a*, displays various kinds of information. The terminal operation portion 3*d* may be configured integrally with the terminal display portion 3*e* as in a touch panel.

Next, a method of managing a carbon dioxide emission amount will now be described. Based on a power consumption amount of the sheet manufacturing apparatus 1, the server 2 calculates a carbon dioxide emission amount. In the power consumption amount of the entirety of the sheet manufacturing apparatus 1, the power consumption amount of the defibrating portion 31 varies significantly depending on the type of a raw material and the like, whereas the power consumption amount of portions excluding the defibrating portion 31 is less susceptible to the influence of the type of a raw material and the like. Therefore, in the present embodiment, the server 2 uses a fixed value that has been determined in advance for the power consumption amount of portions excluding the defibrating portion 31, and calculates the carbon dioxide emission amount by using an actually measured power amount for the power consumption amount of the defibrating portion 31.

Each time the sheet manufacturing apparatus 1 runs once, the server control portion 2*a* of the server 2 calculates the carbon dioxide emission amount for the running, and stores the calculated carbon dioxide emission amount together with the production count into the server storage portion 2*b*. In addition, the server control portion 2*a* calculates a cumulative value of the production count for each running and a cumulative value of the carbon dioxide emission amount for each running, and stores the calculated values into the server storage portion 2*b*. The cumulative value mentioned here is, for example, a cumulative count since the sheet manufacturing apparatus 1 was installed at the current location and began operating. Each time the sheet manufacturing apparatus 1 runs, the server control portion 2*a* transmits notification information that includes the production count, the carbon dioxide emission amount, the cumulative value of the production count, and the cumulative value of the carbon dioxide emission amount to the sheet manufacturing apparatus 1. The notification information transmitted to the sheet manufacturing apparatus 1 suffices to include at least one of the carbon dioxide emission amount for each running once or the cumulative value of the carbon dioxide emission amount, and the other information is not indispensable.

The server 2 behaves also as a Web server, and is capable of presenting the carbon dioxide emission amount to the user of the sheet manufacturing apparatus 1 in the form of a Web page. Specifically, a Web page in which the above-described notification information is written is stored in the server storage portion 2*b*. Each time the carbon dioxide emission amount is written, the server control portion 2*a* updates the Web page. The user is able to cause the terminal display portion 3*e* to display the notification information by making an access to the Web page from the terminal device 3.

Figure 3:
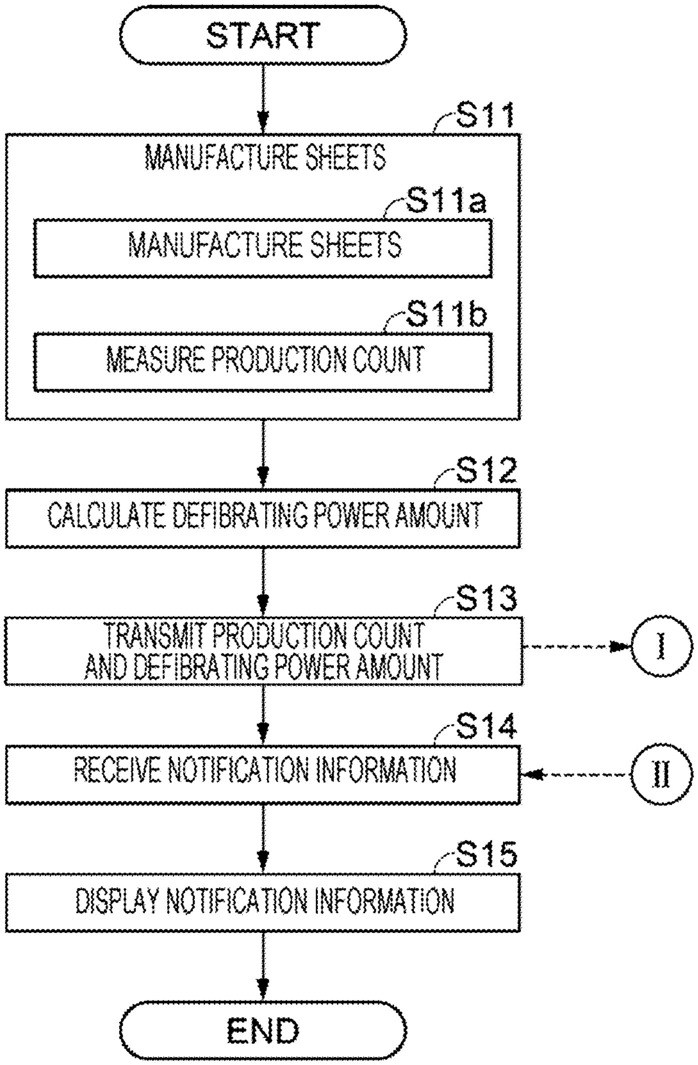
FIG. 3 is a flowchart illustrating an operation of the sheet manufacturing apparatus for explaining a method of managing a carbon dioxide emission amount in the management system.
Figure 4:
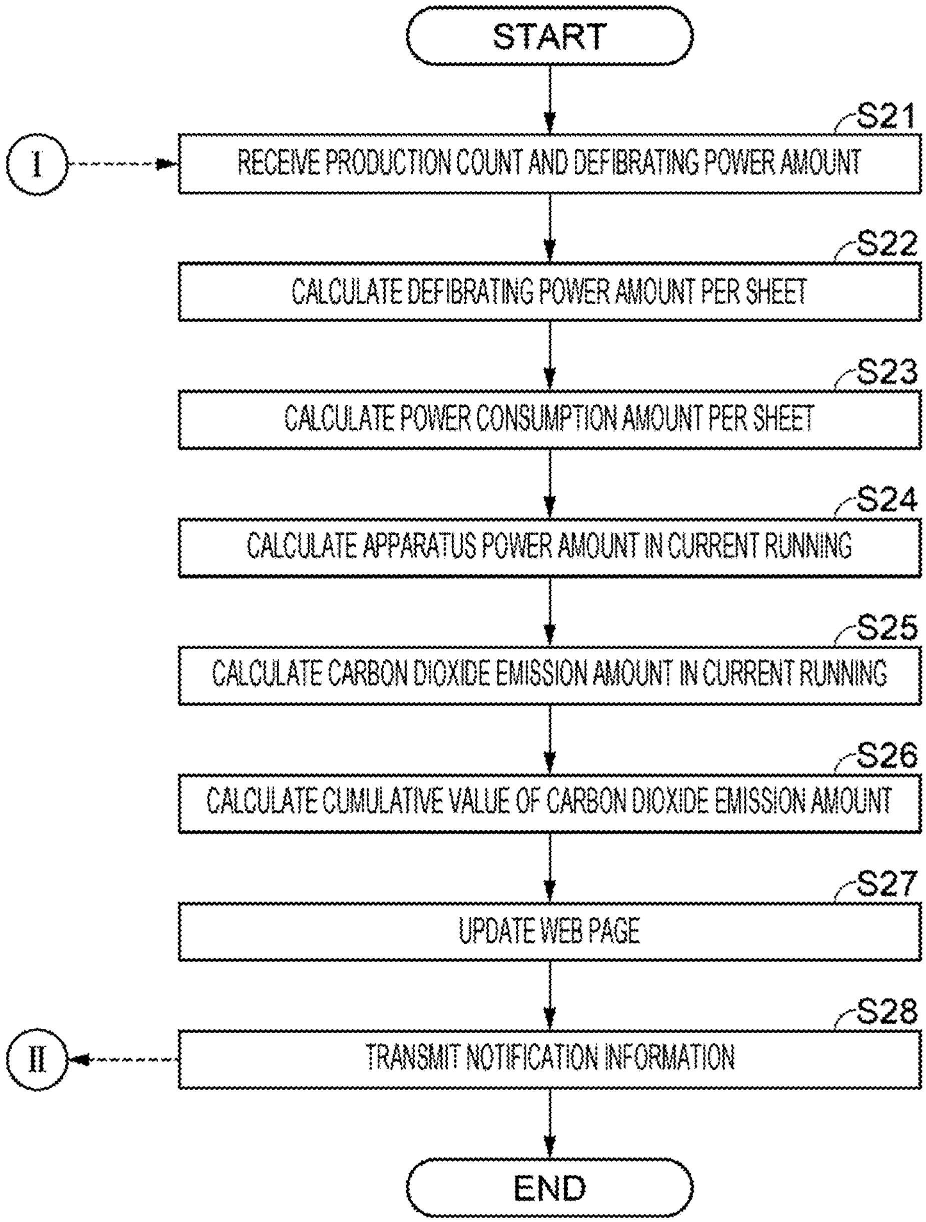
FIG. 4 is a flowchart illustrating an operation of a server for explaining a method of managing a carbon dioxide emission amount in the management system.

FIGS. 3 and 4 are flowcharts for explaining a method of managing a carbon dioxide emission amount in the management system 100. FIG. 3 is a flowchart illustrating the operation of the sheet manufacturing apparatus 1. FIG. 4 is a flowchart illustrating the operation of the server 2.

As illustrated in FIG. 3, in step S11, the sheet manufacturing apparatus 1 manufactures the sheets P3. Specifically, based on an input operation, etc. performed by the user on the operation portion 44, the control portion 41 of the sheet manufacturing apparatus 1 instructs that the manufacturing of the sheets P3 be started. Then, when a manufacturing stop instruction is given by the user or the raw material runs out during the manufacturing of the sheets P3 by the sheet manufacturing apparatus 1, the control portion 41 instructs that the manufacturing of the sheets P3 be terminated. The manufacturing of the sheets P3 in step S11 corresponds to the running of the sheet manufacturing apparatus 1 once. The operation in steps S12 to S15, which follows this step, and the operation of the server 2 in steps S21 to S28 illustrated in FIG. 4, are executed each time the sheet manufacturing apparatus 1 runs once.

The current measurement portion 47 is always measuring the current consumption of the motor 36 of the defibrating portion 31 while the sheet manufacturing apparatus 1 is manufacturing the sheets P3 (step S11*a*). The control portion 41 acquires the measurement result of the current measurement portion 47 in a predetermined cycle. The counting portion 92 measures the production count of the sheets P3 while the sheet manufacturing apparatus 1 is manufacturing the sheets P3 (step S11*b*). That is, the counting portion 92 increments the production count by one each time one sheet P3 is manufactured. Then, after the finishing of the manufacturing of the sheets P3, the control portion 41 acquires the production count from the counting portion 92.

After the finishing of the manufacturing of the sheets P3, in step S12, based on the current consumption of the motor 36 having been measured by the current measurement portion 47, the control portion 41 calculates an amount of power consumption at the defibrating portion 31. The amount of power consumption at the defibrating portion 31 will be hereinafter referred to also as "defibrating power amount". Specifically, the control portion 41 calculates the defibrating power amount [kWh] in the current running by calculating an average value of the current consumption of the motor 36 having been acquired in the predetermined cycle and then by multiplying this value by a voltage supplied to the motor 36 and a running time.

In step S13, the control portion 41 transmits the production count of the sheets P3 having been acquired in step S11 and the defibrating power amount having been calculated in step S12 from the communication portion 43 to the server 2 via the network NW together with identification information for identifying the current running.

As illustrated in FIG. 4, in step S21, the server control portion 2*a* of the server 2 receives, via the server communication portion 2*c*, the production count and the defibrating power amount transmitted from the sheet manufacturing apparatus 1. The server control portion 2*a* stores the received production count and the received defibrating power amount in association with the identification information into the server storage portion 2*b*.

In step S22, based on the received production count and the received defibrating power amount, the server control portion 2*a* calculates a defibrating power amount per sheet [kWh/sheet]. The defibrating power amount per sheet is an amount of power consumed at the defibrating portion 31 for manufacturing one sheet P3, and can be calculated by dividing the received defibrating power amount, that is, the defibrating power amount in the current running, by the received production count. The defibrating power amount per sheet will be hereinafter referred to also as "second unit power amount".

In step S23, based on the defibrating power amount per sheet, the server control portion 2*a* calculates a power consumption amount per sheet of the entirety of the sheet manufacturing apparatus 1 [kWh/sheet]. The power consumption amount per sheet of the entirety of the sheet manufacturing apparatus 1 is an amount of power consumed at the entirety of the sheet manufacturing apparatus 1 for manufacturing one sheet P3. Since the power consumption amount of portions excluding the defibrating portion 31 of the sheet manufacturing apparatus 1 is less susceptible to the influence of the type of a raw material and the like, this amount can be regarded as a value that is proportional to the production count. Therefore, a power consumption amount per sheet at portions excluding the defibrating portion 31 [kWh/sheet] is pre-stored as a fixed value in the server storage portion 2*b*. The power consumption amount per sheet at portions excluding the defibrating portion 31 will be hereinafter referred to also as "first unit power amount". The server control portion 2*a* calculates the power consumption amount per sheet of the entirety of the sheet manufacturing apparatus 1 by adding this first unit power amount to the second unit power amount having been calculated in step S22, that is, the defibrating power amount per sheet.

In step S24, based on the power consumption amount per sheet having been calculated in step S23, the server control portion 2*a* calculates the power consumption amount of the entirety of the sheet manufacturing apparatus 1 in the current running [kWh], that is, the amount of power consumed by the sheet manufacturing apparatus 1 in step S11. The power consumption amount of the entirety of the sheet manufacturing apparatus 1 will be hereinafter referred to also as "apparatus power amount". Specifically, the server control portion 2*a* calculates the apparatus power amount in the current running by multiplying the power consumption amount per sheet of the entirety of the sheet manufacturing apparatus 1 by the production count having been received in step S21. In this way, based on the production count and the defibrating power amount, the server 2 calculates the apparatus power amount through steps S22 to S24.

In step S25, based on the apparatus power amount in the current running having been calculated in step S24, the server control portion 2*a* calculates the carbon dioxide emission amount [kg] of the sheet manufacturing apparatus 1 in the current running. A fixed value [kg/kWh] for finding the carbon dioxide emission amount from the power consumption amount is pre-stored in the server storage portion 2*b*. The server control portion 2*a* calculates the carbon dioxide emission amount in the current running by multiplying the apparatus power amount having been calculated in step S24 by this fixed value. The server control portion 2*a* stores the calculated carbon dioxide emission amount in association with the identification information into the server storage portion 2*b*.

In step S26, the server control portion 2*a* calculates a new cumulative value of the carbon dioxide emission amount by reading a cumulative value of the carbon dioxide emission amount stored in the server storage portion 2*b* and then by adding the carbon dioxide emission amount having been calculated in step S25 to the read value. Similarly, the server control portion 2*a* calculates a new cumulative value of the production count by reading a cumulative value of the production count stored in the server storage portion 2*b* and then by adding the production count in the current running to the read value. The server control portion 2*a* stores the new cumulative value of the carbon dioxide emission amount into the server storage portion 2*b*, thereby updating the cumulative value of the carbon dioxide emission amount stored in the server storage portion 2*b*. The server control portion 2*a* stores the new cumulative value of the production count into the server storage portion 2*b*, thereby updating the cumulative value of the production count stored in the server storage portion 2*b*.

Figure 5:
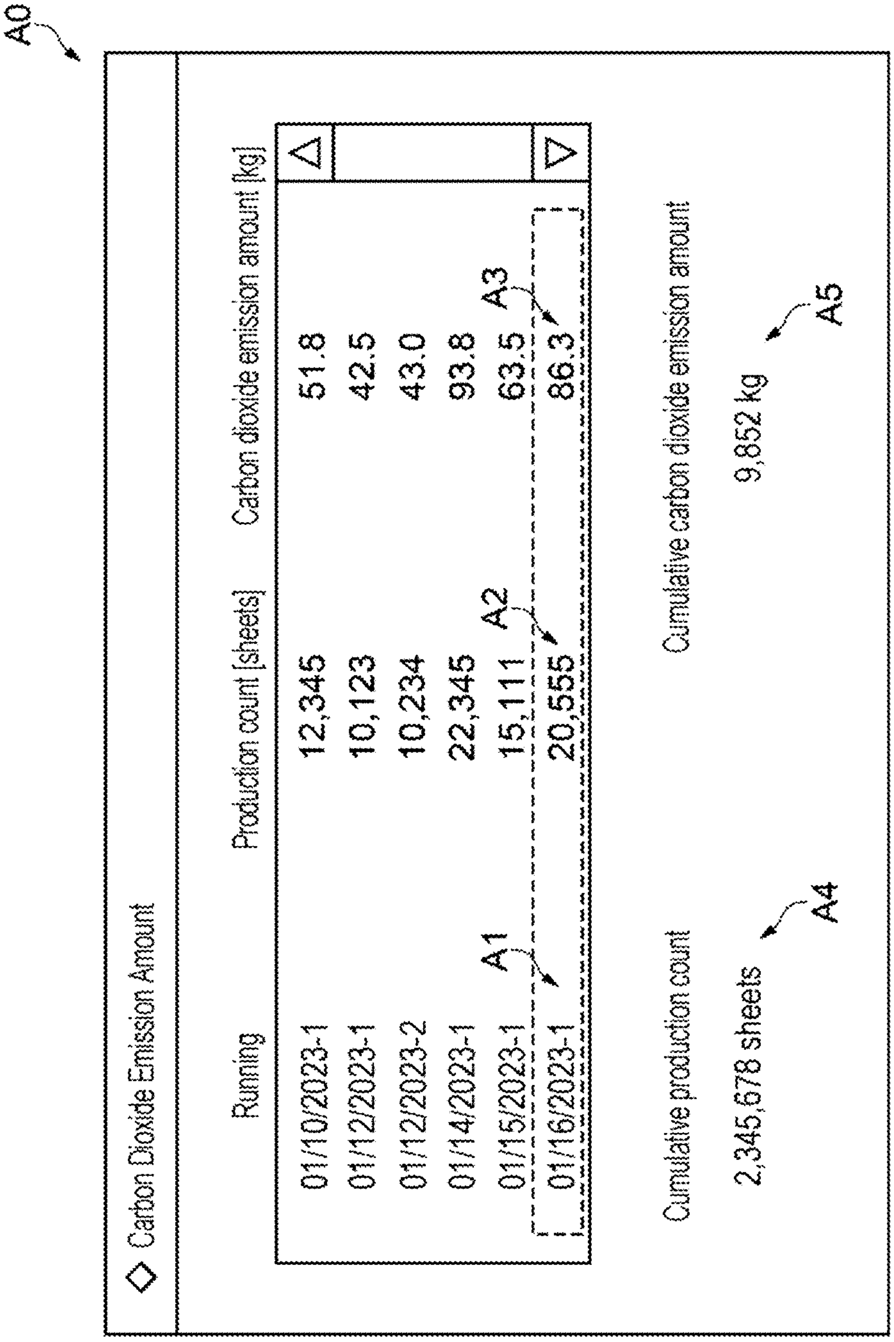
FIG. 5 is a diagram illustrating a Web page on which notification information is displayed.

In step S27, the server control portion 2*a* updates the Web page. That is, the server control portion 2*a* displays the notification information including the calculated carbon dioxide emission amount and the like on the Web page. Specifically, as illustrated in FIG. 5, the server control portion 2*a* adds, to the Web page A0, the identification information A1 representing the current running, the production count A2 in the current running having been received in step S21, and the carbon dioxide emission amount A3 in the current running having been calculated in step S25. In addition, the server control portion 2*a* changes the cumulative value of the production count A4 and the cumulative value of the carbon dioxide emission amount A5 into the new cumulative values having been calculated in step S26.

After this, the user is able to cause the terminal display portion 3*e* to display the production count in the current running, the carbon dioxide emission amount in the current running, the new cumulative value of the production count, and the new cumulative value of the carbon dioxide emission amount by making an access to the Web page from the terminal device 3 via the network NW. Displaying the calculated carbon dioxide emission amount on the Web page as described here is an example of notifying the user of the calculated carbon dioxide emission amount via the network NW. Displaying the calculated cumulative value of the carbon dioxide emission amount on the Web page is an example of notifying the user of the calculated cumulative value of the carbon dioxide emission amount via the network NW. Therefore, the operation of the server 2 in step S27 can be paraphrased as transmitting the calculated carbon dioxide emission amount and the cumulative value thereof to the terminal device 3 in the form of a Web page via the network NW.

In step S28, the server control portion 2*a* transmits the notification information including the calculated carbon dioxide emission amount and the like to the sheet manufacturing apparatus 1 via the network NW. Specifically, the server control portion 2*a* transmits the production count in the current running, the carbon dioxide emission amount in the current running, the new cumulative value of the production count, and the new cumulative value of the carbon dioxide emission amount to the sheet manufacturing apparatus 1 via the server communication portion 2*c* together with the identification information.

Referring back to FIG. 3, in step S14, the control portion 41 of the sheet manufacturing apparatus 1 receives, via the communication portion 43, the notification information transmitted from the server 2.

Then, in step S15, the control portion 41 causes the display portion 45 to display the received notification information, that is, the production count in the current running, the carbon dioxide emission amount in the current running, the new cumulative value of the production count, and the new cumulative value of the carbon dioxide emission amount, and terminates the flow. Transmitting the calculated carbon dioxide emission amount to the sheet manufacturing apparatus 1 via the network NW and displaying the calculated carbon dioxide emission amount on the display portion 45 that the user can browse as described here is an example of notifying the user of the calculated carbon dioxide emission amount via the network NW. Transmitting the calculated cumulative value of the carbon dioxide emission amount to the sheet manufacturing apparatus 1 via the network NW and displaying the calculated cumulative value of the carbon dioxide emission amount on the display portion 45 that the user can browse is an example of notifying the user of the calculated cumulative value of the carbon dioxide emission amount via the network NW. If the control portion 41 of the sheet manufacturing apparatus 1 is configured to manage the production count and the cumulative value of the production count, there is no need to transmit the production count and the cumulative value of the production count from the server 2 to the sheet manufacturing apparatus 1.

As explained above, with a method of managing a carbon dioxide emission amount according to the present embodiment, the following effects can be obtained.

According to the present embodiment, based on the current consumption of the motor 36 of the defibrating portion 31, the carbon dioxide emission amount of the sheet manufacturing apparatus 1 is calculated and notified to the user. Therefore, the user is able to grasp the carbon dioxide emission amount of the sheet manufacturing apparatus 1. In the power consumption amount of the entirety of the sheet manufacturing apparatus 1, the power consumption amount of the defibrating portion 31 varies significantly depending on the type of a raw material and the like, whereas the power consumption amount of portions other than the defibrating portion 31 is less susceptible to the influence of the type of a raw material and the like. Therefore, it is possible to estimate the power consumption amount of the entirety of the sheet manufacturing apparatus 1, that is, the carbon dioxide emission amount, by means of the current consumption of the defibrating portion 31 without any need for measuring the current consumption of portions other than the defibrating portion 31. Accordingly, it is possible to calculate the carbon dioxide emission amount easily with a simple configuration.

Moreover, according to the present embodiment, since the cumulative value of the carbon dioxide emission amount is notified to the user, the user is able to grasp the cumulative value of the carbon dioxide emission amount in the sheet manufacturing apparatus 1.

Moreover, according to the present embodiment, the first unit power amount, which is the power consumption amount per sheet at portions excluding the defibrating portion 31 of the sheet manufacturing apparatus 1, is stored in the server 2. Therefore, the server 2 can easily calculate the apparatus power amount, which is the power consumption of the entirety of the sheet manufacturing apparatus 1, from the second unit power amount, which is the defibrating power amount per sheet.

Moreover, according to the present embodiment, since the carbon dioxide emission amount calculated at the server 2 is displayed on the display portion 45 of the sheet manufacturing apparatus 1, the user is able to easily grasp the carbon dioxide emission amount.

Moreover, according to the present embodiment, since the carbon dioxide emission amount calculated at the server 2 is displayed on the terminal device 3 possessed by the user, the user is able to grasp the carbon dioxide emission amount even at a location away from the sheet manufacturing apparatus 1.

Although the present embodiment has the configuration described above basically, partial changes in configuration, omission, etc. can be made within a range of not departing from the gist of the present disclosure. The present embodiment and the variation examples described below may be combined with one another as long as they are not technically contradictory to one another. Some variation examples will now be explained.

In the foregoing embodiment, the server 2 notifies the user of the notification information that includes both the carbon dioxide emission amount in running once and the cumulative value of the carbon dioxide emission amount. However, the present disclosure is not limited to this mode. For example, the carbon dioxide emission amount in running once, not both, may be notified, or the cumulative value of the carbon dioxide emission amount only may be notified. The cumulative value of the carbon dioxide emission amount is not limited to a cumulative value since the installation of the sheet manufacturing apparatus 1 but may be a cumulative value in a predetermined period such as a day, a week, a year, or the like. That is, the carbon dioxide emission amount notified to the user of the sheet manufacturing apparatus 1 via the network NW may be a carbon dioxide emission amount in running once, a cumulative value of a carbon dioxide emission amount in a predetermined period, or a cumulative value of a carbon dioxide emission amount since the installation of the sheet manufacturing apparatus 1. Two or more of them may be notified.

In the foregoing embodiment, the server 2 updates the Web page in step S27 and transmits the notification information to the sheet manufacturing apparatus 1 in step S28. However, the server 2 may be configured to perform either one only of this updating and this transmission.

In the foregoing embodiment, if a plurality of sheet manufacturing apparatuses 1 is connected to the network NW, managing the calculated carbon dioxide emission amount by the server 2 in association with apparatus identification information for identifying the sheet manufacturing apparatus 1 suffices.

In the foregoing embodiment, the server 2 transmits the notification information including the calculated carbon dioxide emission amount and the like to the terminal device 3 in the form of a Web page. However, the mode of transmission is not limited to a Web page. For example, the transmission may be performed by means of a predetermined application program installed in the terminal device 3, or any other mode of transmission such as an electronic mail may be used.

What is claimed is:

1. A method of managing a carbon dioxide emission amount in a management system, the management system including a sheet manufacturing apparatus that manufactures sheets and a server that is connected to the sheet manufacturing apparatus via a network, the sheet manufacturing apparatus including at least
- a defibrating portion that defibrates a raw material into fibers by being driven by a motor,
- an accumulating portion that forms a web using the fibers,
- a molding portion that molds the web into a shape of a band-like sheet by applying heat and pressure to the web,
- a current measurement portion that measures a current consumption of the motor, and
- a counting portion that counts a number of the sheets manufactured, the number being hereinafter referred to as production count, the method comprising:

at each time of running once,
- calculating, by the sheet manufacturing apparatus, a defibrating power amount, which is a power consumption amount of the defibrating portion, based on the current consumption of the motor measured by the current measurement portion;
- transmitting the production count and the defibrating power amount to the server via the network, by the sheet manufacturing apparatus;
- pre-storing, by the server, a first unit power amount, which is a power consumption amount per sheet at portions excluding the defibrating portion of the sheet manufacturing apparatus, the sheet being one of the sheets, at least the accumulating portion and the molding portion being included in the portions excluding the defibrating portion;
- calculating, by the server, a second unit power amount, which is a defibrating power amount per the sheet, based on the production count and the defibrating power amount;
- calculating, by the server, a power consumption amount per the sheet of an entirety of the sheet manufacturing apparatus by adding the first unit power amount to the second unit power amount, the calculating of the power consumption amount per the sheet of the entirety of the sheet manufacturing apparatus being performed without measurement of a current consumption of the portions excluding the defibrating portion;
- calculating, by the server, an apparatus power amount, which is a power consumption amount of the entirety of the sheet manufacturing apparatus, based on the production count and the defibrating power amount, the calculating of the apparatus power amount being performed by multiplying the power consumption amount per the sheet of the entirety of the sheet manufacturing apparatus by the production count;
- calculating, by the server, a carbon dioxide emission amount of the sheet manufacturing apparatus, based on the apparatus power amount; and
- notifying, by the server, a user of the sheet manufacturing apparatus of the calculated carbon dioxide emission amount via the network.

2. The method of managing a carbon dioxide emission amount according to claim 1, further comprising
- calculating, by the server, a cumulative value of the carbon dioxide emission amount for each running, wherein
- the calculated cumulative value of the carbon dioxide emission amount is notified to the user via the network.

3. The method of managing a carbon dioxide emission amount according to claim 1, wherein
- the sheet manufacturing apparatus further includes a display portion, and
- the method further comprises
- transmitting, by the server, the calculated carbon dioxide emission amount to the sheet manufacturing apparatus via the network, and
- causing the display portion to display the received carbon dioxide emission amount.

4. The method of managing a carbon dioxide emission amount according to claim 1, wherein
- a terminal device possessed by the user is connected to the network, and
- the method further comprises transmitting, by the server, the calculated carbon dioxide emission amount to the terminal device via the network.

* * * * *